United States Patent [19]
Weiss et al.

[11] Patent Number: 6,097,931
[45] Date of Patent: Aug. 1, 2000

[54] TWO-WAY PAGING UPLINK INFRASTRUCTURE

[75] Inventors: Anthony J. Weiss, Tel Aviv; Yair Karmi, Rishon Lezion, both of Israel; Ilan Zorman; Haim Harel, both of Palo Alto, Calif.

[73] Assignee: Wireless Online, Inc., Los Altos, Calif.

[21] Appl. No.: 08/915,479

[22] Filed: Aug. 20, 1997

[51] Int. Cl.$^7$ .................................................. H04B 7/00
[52] U.S. Cl. ......................... 455/38.1; 455/562; 343/848
[58] Field of Search ................................... 455/562, 458, 455/38.1, 561, 276.1, 277.1, 277.2, 278.1; 340/825.44; 343/848

[56] References Cited

U.S. PATENT DOCUMENTS

| | | | |
|---|---|---|---|
| 4,882,588 | 11/1989 | Ruiz et al. | |
| 5,039,994 | 8/1991 | Wash et al. | 343/848 |
| 5,432,780 | 7/1995 | Smith et al. | 455/562 |
| 5,448,751 | 9/1995 | Takenaka et al. | |
| 5,535,423 | 7/1996 | Dupuy | 455/562 |
| 5,596,333 | 1/1997 | Bruckert | 455/277.1 |
| 5,648,784 | 7/1997 | Shaw et al. | |
| 5,724,666 | 3/1998 | Dent | 455/101 |
| 5,742,911 | 4/1998 | Dumbrill et al. | 455/562 |
| 5,870,681 | 2/1999 | Myer | 455/562 |
| 5,885,192 | 3/1999 | Karlsson | 455/562 |
| 5,930,243 | 7/1999 | Parish et al. | 455/562 |

OTHER PUBLICATIONS

Balanis, C.A., in: Antenna Theory, Analysis and Design, Harper and Row Inc., pp. 679–685 and 698–699 (1982).
Mailloux, R.J., in: Phase Array Antenna Handbook, Artech House, Inc., pp. 13–20, 438–445, and 521–524 (1994).
Motorola, Inc. Semiconductor Technical Data, FLEXchip Signal Processor, Publication No. MC68175/D 109 pages (1996).
Motorola, Inc. FLEXstack One Way Software Development Kit, Version 2.0, 66 pages (Dec. 13, 1996).
Motorola, Inc., Flexible High Speed Paging Protocol Benchmarking, 16 pages (Apr. 26, 1994).
Motorola, Inc., FLEX Protocol's Operational Capabilities for Local, Regional, Nationwide and Global Roaming—Preliminary, 32 pages (Jul. 18, 1995).
Motorola, Inc., Typical FLEX Pager Block Diagram with FLEXstack, 1 page (Mar. 27, 1997) www.mot.com/SPS/DSP/flexchip/.
Texas Instruments TMS320FLEX1 chipset Product Brief, 3 pages (Mar. 27, 1997) www.ti.com/sc/docs/wireless/page-.htm.
Texas Instruments Press Release, "TI Chip Set Supporting FLEX Messaging Protocol Now Available" 2 pages (Nov. 11, 1996) www.ti.com/sc/docs/news/1996/96070.htm.
Texas Instruments, TLV5591 Data Manual for FLEX Decoder, Appendix A and B, 22 pages (Apr. 17, 1996).

*Primary Examiner*—Edward F. Urban
*Attorney, Agent, or Firm*—Townsend and Townsend and Crew LLP; Kenneth R. Allen

[57] ABSTRACT

A substitute for the uplink infrastructure associated with typical two-way paging protocols. Instead of employing a microcellular arrangement of paging receiver sites, wherein each cell is served by its own receiver site, multiple cells are serviced from a single receiver site. The operation of the protocol need not be modified. A region surrounding the single receiver site is divided into angular sectors. Each angular sector has an associated beam of a multi-element antenna array. The sectors represent the cells used by prior art two-way paging infrastructure. This approach substantially reduces the cost of constructing and operating a two-way pager infrastructure.

10 Claims, 5 Drawing Sheets

000300, filed on May 22, 1997. The contents of these co-assigned applications are herein incorporated by reference for all purposes.

TWO-WAY PAGING UPLINK INFRASTRUCTURE

STATEMENT OF RELATED APPLICATIONS

The present application relates to the subject matter of three co-assigned applications: VERSATILE ANTENNA ARRAY FOR MULTIPLE PENCIL BEAMS AND EFFICIENT BEAM COMBINATIONS, application Ser. No. 08/808,347, MULTI-CHANNEL MULTI-BEAM ENCODING SYSTEM, Attorney Docket No. 017994-000600, filed on May 22, 1997, METHOD AND APPARATUS FOR ADAPTING OMNIDIRECTIONAL SYNCHRONOUS WIRELESS COMMUNICATIONS PROTOCOL TO SECTORIAL ENVIRONMENTS, Attorney Docket No. 017994-000300, filed on May 22, 1997. The contents of these co-assigned applications are herein incorporated by reference for all purposes.

BACKGROUND OF THE INVENTION

The present application relates generally to paging network architecture and operation and more particularly to two-way paging.

Two-way paging systems that allow the individual subscriber to transmit responses are becoming more and more prevalent. For example, a recent pager product from Motorola of Schaumburg, Ill., the Tango™ pager product, allows one to address a message to a particular pager subscriber unit and specify within the message multiple possible responses. The user of the subscriber unit then selects a response which is returned to the message sender.

Power consumption within a two-way pager subscriber unit presents a problem because transmitter operation inherently consumes far more power than receiver operation alone. Even modest transmitter power output levels require either large batteries, making the whole unit less compact and convenient, or very short battery life, necessitating frequent battery changes.

FIG. 1 depicts a prior art two-way paging network infrastructure developed to address the problem of pager power consumption. FIG. 1 depicts elements of a paging network 100 operating within a circular region 102. A transmitter site 104 sends messages to individual two-way pager units 106 within region 102. However, to save on power consumption, individual pager units 106 do not have sufficient transmitter power to reach transmitter site 104 with their responses. Accordingly, paging network 100 also includes a plurality of paging receiver sites 108 for receiving transmissions from individual pager units 106, effectively representing a microcellular system for receiving pager responses and registration messages. Each such paging transmitter site 104 covers a region having a diameter of 20 miles. Each such paging receiver site 108, however, covers a region covering only 20% of the area covered by paging transmitter site 104.

The need for numerous closely spaced paging receiver sites greatly complicates the construction and maintenance of the paging network infrastructure. Particularly in crowded urban areas, site acquisition is an expensive and cumbersome process. Also, the receiver sites must all be maintained independently. What is needed is a paging infrastructure that supports low-power capabilities but with reduced infrastructure construction and maintenance costs. SUMMARY OF THE INVENTION The present invention provides, e.g., a substitute for the uplink infrastructure associated with typical two-way paging protocols. Instead of employing a microcellular arrangement of paging receiver sites, wherein each cell is served by its own receiver site, the present invention contemplates servicing multiple cells from a single receiver site. The operation of the protocol need not be modified. A region surrounding the single receiver site is divided into angular sectors. Each angular sector has an associated beam of a multi-element antenna array. The sectors represent the cells used for the up-link in prior art two-way pager infrastructure. This approach substantially reduces the cost of constructing and operating a two-way pager infrastructure.

In accordance with a first aspect of the present invention, a method for operating the uplink portion of a two-way paging network includes steps of: providing a plurality of receivers at a receiver site, each of the receivers coupled to a selected beam of a plurality of beams of a multi-element antenna array, the plurality of beams dividing a region surrounding the receiver site into sectors reached by individual ones of the plurality of beams, and employing the receivers to receive messages transmitted from a plurality of pagers via the plurality of beams.

In accordance with a second aspect of the present invention, a receiver system in a two-way paging network includes: a plurality of receivers at a receiver site, and a beamforming network. Each output of the beamforming network is coupled to one of the plurality of receivers. Each input of the beamforming network is coupled to an element of a multi-element antenna array. Each of the receivers is coupled to a selected beam of a plurality of beams of the multi-element antenna array. The plurality of beams divide a region surrounding the receiver site into sectors reached by individual ones of the plurality of beams.

A further understanding of the nature and advantages of the inventions herein may be realized by reference to the remaining portions of the specification and the attached drawings.

DESCRIPTION OF SPECIFIC EMBODIMENTS

Figure 1:
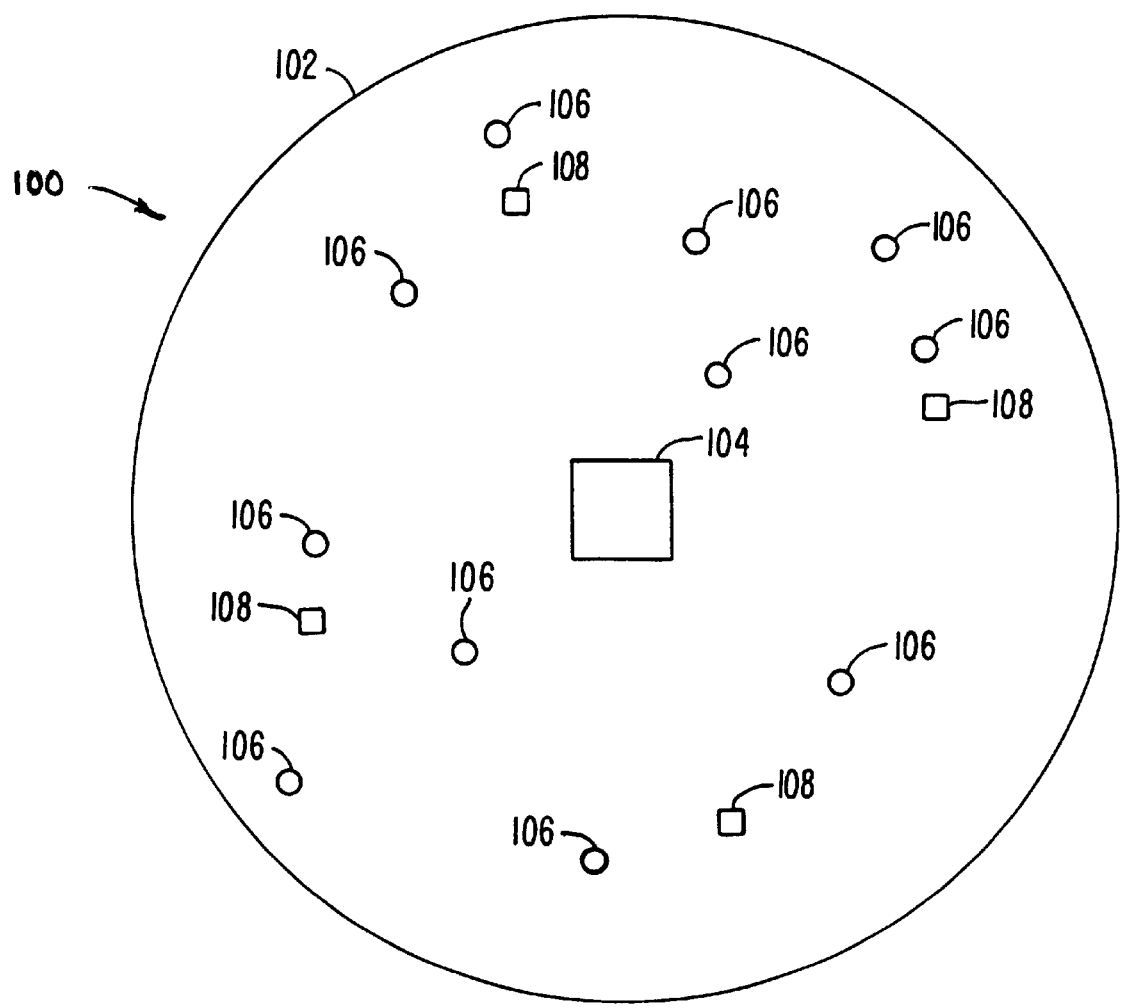
FIG. 1 depicts a prior art two-way paging network infrastructure developed to address the problem of pager power consumption.
Figure 2:
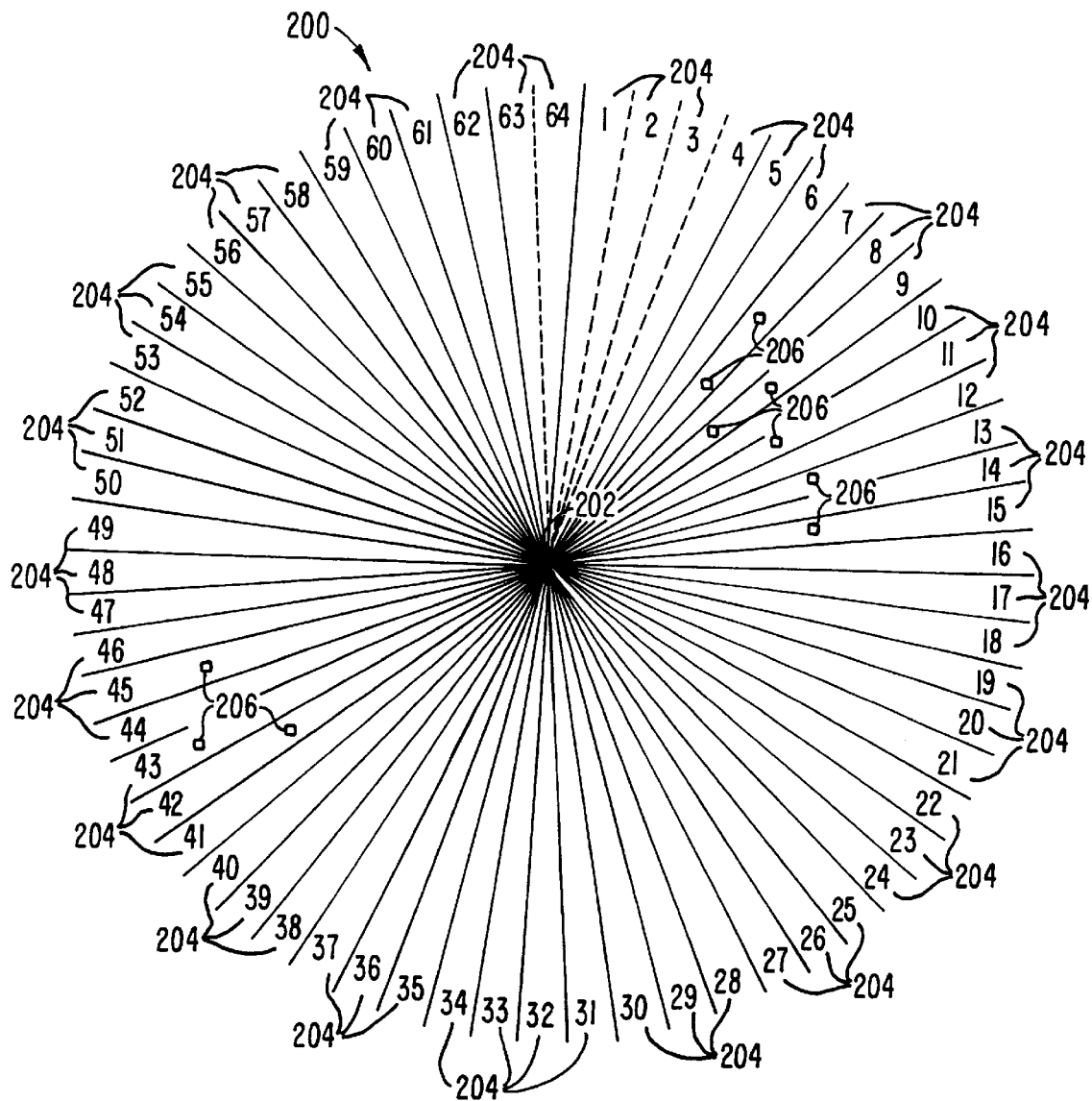
FIG. 2 depicts the up-link portion of a two-way paging network in accordance with one embodiment of the present invention.

FIG. 2 depicts the up-link portion of a two-way paging network in accordance with one embodiment of the present invention. FIG. 2 depicts a multi-beam pager up-link network 200 using a multi-beam reception scheme described in U.S. patent app. Ser. No. 08/808,347. A pager receiver site 202 is equipped with an antenna system having 64 different reception beams, approximately evenly spaced from each other around transmitter site 202. Each beam defines a different sector 204 of the region surrounding site 202. A plurality of two-way pager units 206 are distributed throughout the various sectors.

Although FIG. 2 depicts 64 beams, the present invention does not require any particular number of beams. In a preferred family of embodiments, the number of beams is between 8 and 128. Also, FIG. 2 depicts the beams received for a particular frequency. The present invention encompasses both single and multiple frequency embodiments. As om amu two-way communication system, using more than one frequency increases system capacity at the expense of greater spectrum usage and subscriber unit complexity.

Figure 3:
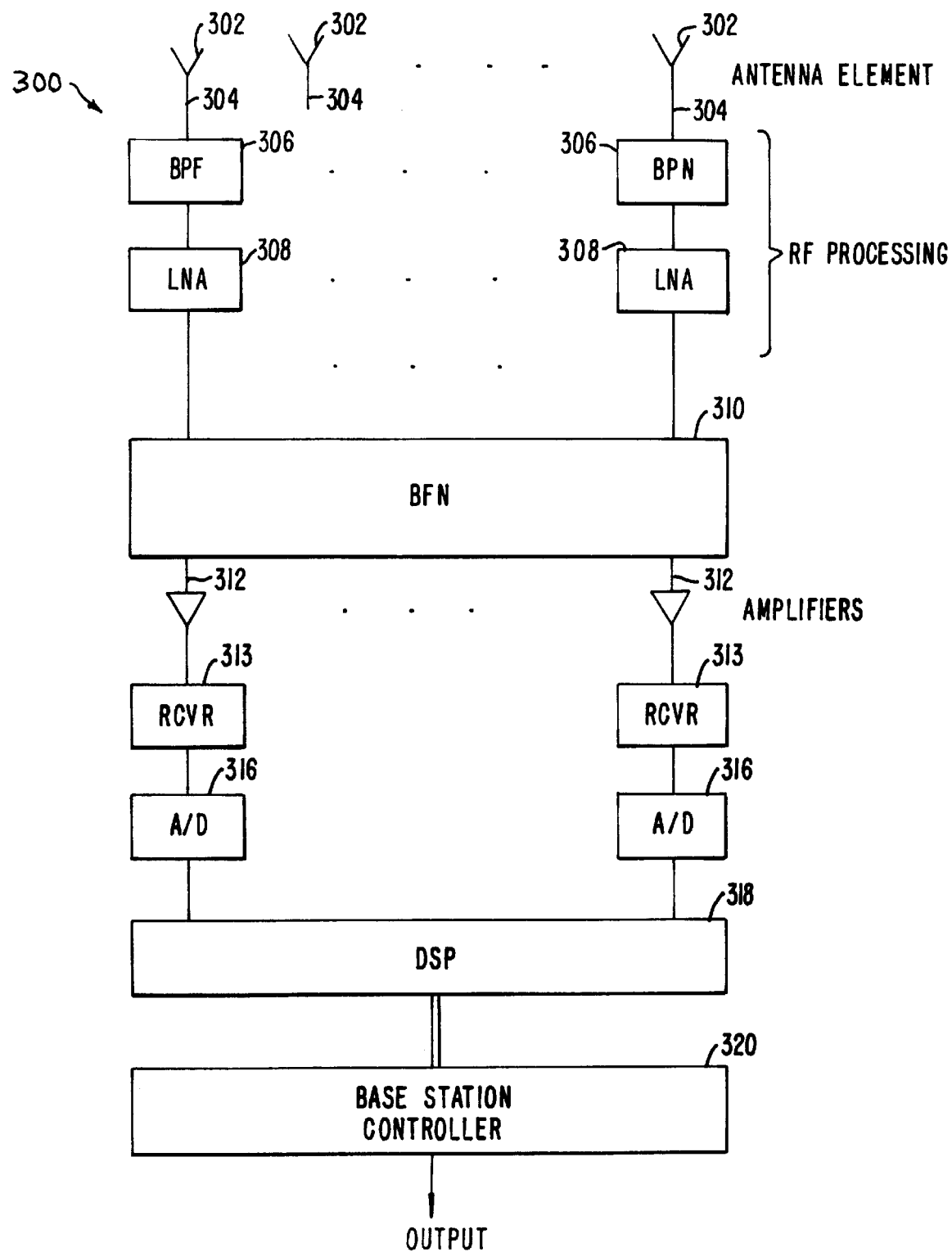
FIG. 3 depicts a block diagram of the receiver site infrastructure employed with the paging network of FIG. 2 in accordance with one embodiment of the present invention.

FIG. 3 depicts a block diagram of the receiver site infrastructure 300 employed with the paging network of FIG. 2 in accordance with one embodiment of the present invention. A multi-element antenna array 302 includes multiple elements 304. The output of each element 304 is subject to a bandpass filter 306, and a low-noise amplifier 308. All of the low-noise amplifier outputs are input to a beamforming network 310. Beamforming network 310 has as its inputs signals corresponding to each antenna element 302 and has its output signals 312 corresponding to each beam. Each beam signal 312 is subject to amplification by an amplifier 313 and input to one of receivers 314 which downconvert the signal to a frequency appropriate to conversion to digital form by one of A/D converters 316. The outputs of A/D converters 316 are input to a digital signal processing stage 318 which outputs the information transmitted by two-way pager units 206 to a base station controller 320. Base station controller 320 operates in accordance with the relevant two-way pager protocol such as Reflex or Inflexion, promulgated by Motorola, Inc. of Schaumburg, Ill. Base station controller 320 relays the information via the public switched telephone network if appropriate.

Figure 4:
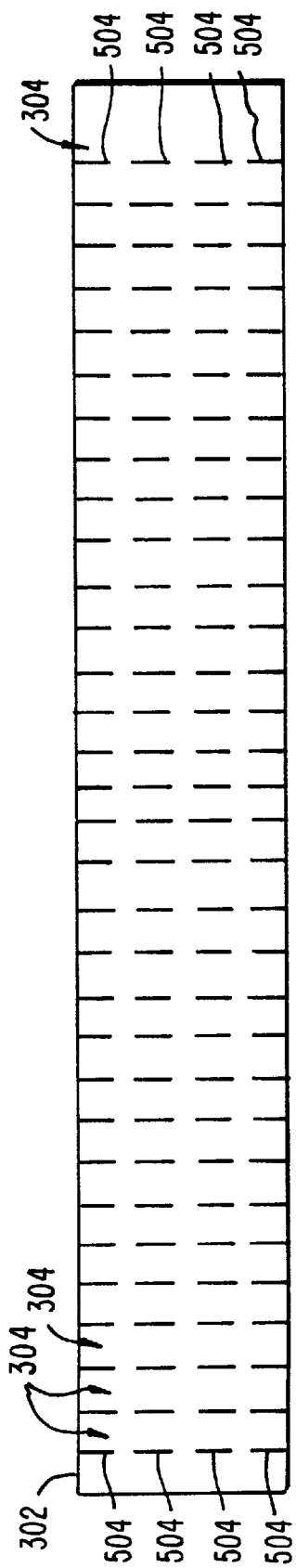
FIG. 4 depicts a front view of a multi-element antenna array in accordance with one embodiment of the present invention.

FIG. 4 depicts a partial front view of multi-element antenna array 302 in accordance with one embodiment of the present invention. Each of 64 antenna elements 304 includes a column of four vertical dipoles 504. Although there are 64 antenna elements, 32 are shown. The center taps of each dipole 504 of a given antenna element 502 are connected together. Antenna elements 304 are evenly spaced along a line. In one embodiment optimized for reception at 901 MHZ, there are 64 antenna elements, each including a column of 4 dipoles. The horizontal dimension of array 302 is then 260 cm and the vertical dimension is 180 cm. The number of elements, number of dipoles in each element, dipole spacing, dipole shape, element spacing, horizontal and vertical dimensions, and other antenna characteristics are design choices within the scope of the present invention. To achieve the coverage of FIG. 2, the elements of array 302 shown in FIG. 4 could be divided among three arrays, each covering approximately 120 degrees of a circle surrounding the receiver site.

Figure 5:
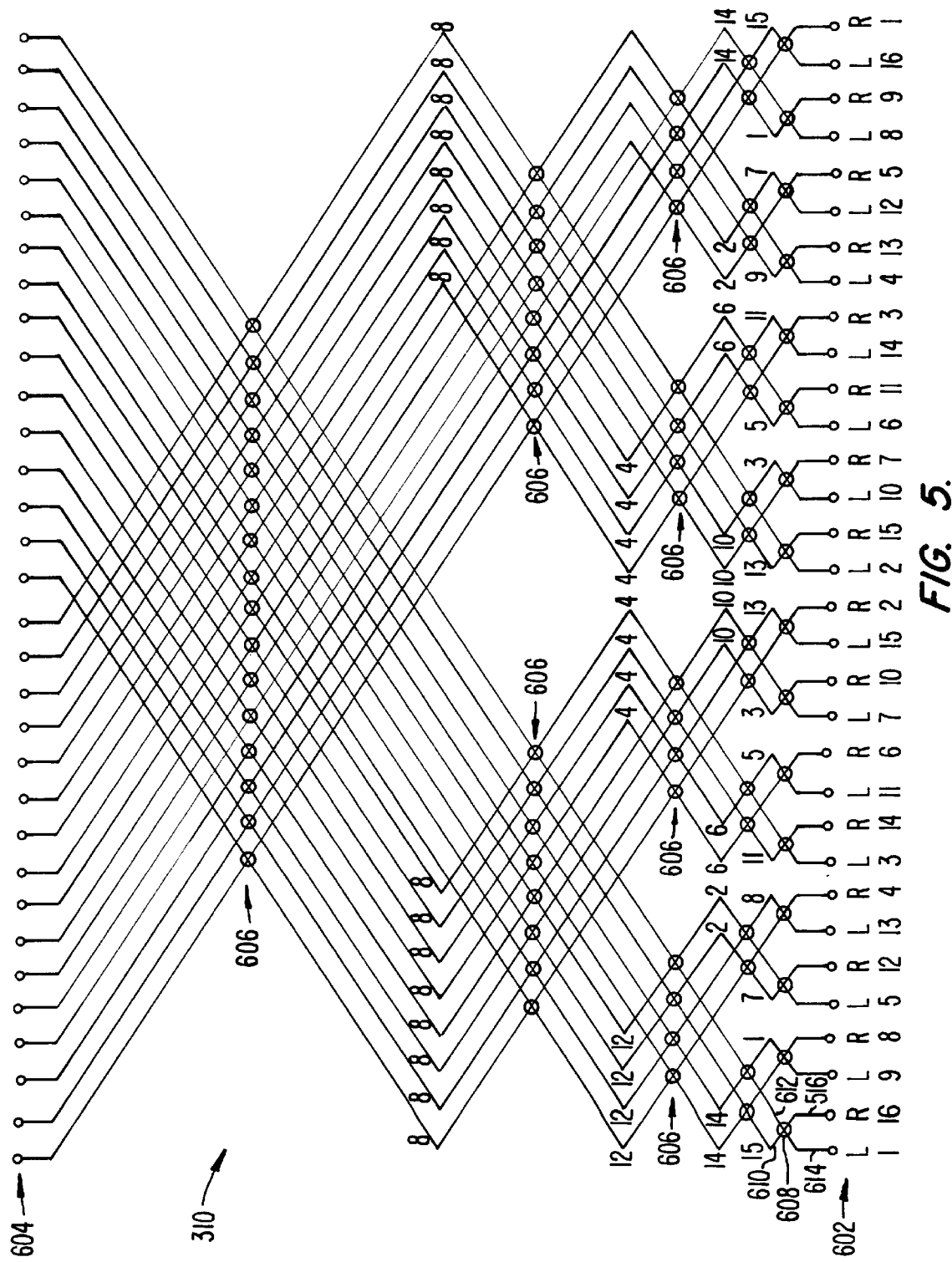
FIG. 5 depicts the structure of a beamforming network as would be coupled to the multi-element antenna array of FIG. 4.

FIG. 5 depicts the structure of beamforming network 310 as would be coupled to a multi-element antenna array of FIG. 4. Beamforming network 310 is preferably a Butler matrix. Beamforming network 310 is preferably a passive network. Generally, the signal flow is from top to bottom.

The depicted embodiment of beamforming network 310 has 32 outputs 602 and 32 inputs 604. Each input 604 corresponds to an antenna element 502. Each output 602 corresponds to the signal for a beam of a particular multi-element antenna array 108. The beams closest to the center of the radiation pattern sector developed by a particular multi-element antenna array have their outputs labeled "L1" and "R1" respectively. The structure of beamforming network 310 includes many passive hybrids 606. A particular passive hybrid 608 has its inputs and outputs labeled.

Passive hybrid 608 has two inputs 610 and 612 and two outputs 614 and 616. Output 614 represents the sum of input 610 with no phase change and input 612 with a 90 degree phase change. Similarly, output 616 represents the sum of input 612 with no phase change and input 610 with a 90 degree phase change.

Some of the signal lines in FIG. 6 are marked with numbers, n. These indicate a phase shift of $n\pi/32$ radians. For example, a signal line marked by the number 10 indicates a phase shift of $10\pi/32$ radians. What follows is a discussion of the theory of operation and performance of a multi-element antenna array according to the present invention.

Consider a linear array of antenna elements as depicted in FIG. 3. The far field of the ith element at a given measurement point is given by $$E_i = f(\theta, \phi) \frac{e^{-jkR_i}}{R_i} \tag{1}$$

where $f(\theta, \phi)$ is the element radiation pattern, $R_i$ is the distance of the measurement point from the ith element, $k = 2\pi/\lambda$ is the wave number and $\lambda$ is the signal wavelength. Also note that $\theta$ is used to denote elevation and $\phi$ to denote azimuth and finally $j\Delta\sqrt{-1}$. FIG. 5 shows this arrangement of the coordinate system.

Since we assume that the radiation is measured at a distance which is much larger than the array dimension we can use the approximation, $$R_i \simeq R - \hat{r} \cdot r_i \tag{2}$$

where R is the distance of the measurement point from the origin of coordinates, $r_i$ is the vector from the origin of coordinates to the location of the sensor and $\hat{r}$ is a unit vector pointing from the origin towards the measurement location. Substituting (2) in (1) we obtain $$E_i = f(\theta, \phi) \frac{e^{-jkR} e^{jk\hat{r} \cdot r_i}}{R} \tag{3}$$

By superposition, the field generated by N elements together, with different complex weighting $a_i$ of each element, is $$E = \sum_{i=o}^{N-1} a_i E_i = f(\theta, \phi) \frac{e^{-jkR}}{R} \sum_{i=0}^{N-1} a_i e^{jk\hat{r} \cdot r_i} \tag{4}$$

Define the array factor $$F \Delta \sum_{i=0}^{N-1} a_i e^{jk\hat{r} \cdot r_i} \tag{5}$$

which will be used in the following to describe the array radiation pattern. In order to further simplify the exposition we assume that the elements are equally spaced with a spacing denoted by d and they are all located on a straight line (the x axis). In this case we have $$r_i = id\hat{x} + 0\hat{y} + 0\hat{z} = id\sqrt{x} \tag{6}$$

where $\hat{x}, \hat{y}, \hat{z}$ are unit vectors in the directions of the coordinate system axis and $$\hat{r} = \sin\theta\cos\phi\hat{x} + \sin\theta\sin\phi\hat{y} + \cos\theta\hat{z} \qquad (7)$$

We get $$\hat{r} \cdot r_i = id\sin\theta\cos\phi \qquad (8)$$

and (5) becomes $$F(\theta, \phi) = \sum_{i=0}^{N-1} a_i e^{jkid\sin\theta\cos\phi} \qquad (9)$$

and for $\theta = \pi/2$ equation (9) becomes $$F(\pi/2, \phi) = \sum_{i=0}^{N-1} a_i e^{jkid\cos\phi} \qquad (10)$$

In order to point a beam towards direction $\phi_m$ the weights are selected as follows $$a_i = \omega_i e^{-jkid\cos\phi_m} \qquad (11)$$

where $\omega_i$ is a real number equal to $|a_i|$.

Beamforming network 308 generates N beams simultaneously. To achieve a simple implementation of beamforming network 308, FFT techniques are used. These techniques are based on the formulation:

$$a_i / \omega_i = e^{-jkid\cos\phi_m} = e^{-j\psi(i) - j\frac{2\pi m}{N}} \qquad (12)$$

which leads to $$\cos\phi_m = \frac{\psi(i)}{kid} + \frac{2\pi m}{Nkd} = \frac{\psi(i)}{kid} + \frac{\lambda m}{Nd} \qquad (13)$$

The last equation was obtained by using $k = 2\pi/\lambda$. A useful choice for the first expression on the right is $$\frac{\psi(i)}{kid} = -\frac{(N-1)\pi}{kdN} = -\frac{(N-1)\lambda}{2dN} \qquad (14)$$

Substituting (14) into (13) we get $$\cos\phi_m = -\frac{(N-1)\lambda}{2dN} + \frac{\lambda m}{Nd} = \frac{\lambda}{d}\frac{(2m-N+1)}{2N} \qquad (15)$$

Note that if $d = \lambda/2$ we get $$[\cos\phi_0, \cos\phi_1, \cdots \cos\phi_{N-1}] = \frac{1}{N}[-(N-1), -(N-3), \cdots)N-1)] \qquad (16)$$

In other words, we have N beams in the interval between 0 and $\pi$.

This formulation results in a simple hardware design using the Butler matrix such as is shown in FIG. 4. Further information about Butler matrix networks is given in Robert J. Mailloux, *Phased Array Antenna Handbook*, Artech House, Inc., 1994, the contents of which are herein incorporated by reference.

If the output signal of the ith antenna element is denoted by $y_i$ the mth beam is formed by $$B_m = \sum_{i=0}^{N-1} y_i a_i = \sum_{i=0}^{N-1} y_i \omega_i e^{-j\psi(i)} e^{\frac{-j2\pi mi}{N}} = \sum_{i=0}^{N-1} \tilde{y}_i e^{\frac{-j2\pi 2mi}{N}} \qquad (17)$$

where $$\tilde{y}_i = y_i \omega_i e^{-j\psi(i)} \qquad (18)$$

Note that the last equation in (17) requires N complex multiplications (or phase shifts) for generating a single beam $B_m$. For generating Nbeams $B_0, B_1, \ldots, B_{N-1}$ one needs $N^2$ multiplications. However, due to its special form Equation (17) can be implemented by FFT. This technique reduces the number of multiplications (phase shifts) from $N^2$ to $N\log_2 N$.

The side lobes of the various beams can be reduced at the expense of beam broadening by choosing proper weights $\omega_i$. This is also called tapering. In a preferred embodiment weights are chosen using the Taylor Line-Source (Tschebyscheff Error) procedure as described in C. A. Balanis, *Antenna Theory Analysis and Design*, Harper and Row, Publishers, Inc., 1982, the contents of which are herein incorporated by reference. This technique yields side lobes that are 30 dB below the main lobe.

A single receiver site according to the present invention may provide coverage over an area that required multiple receiver sites in the prior art. In part, this is because multi-element antenna arrays 402 provide significant gain for reception from a particular sector when operating in conjunction with beamforming network 310. In a preferred embodiment, this gain is approximately 24 to 27 dBi.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. A method for operating the uplink portion of a two-way paging network comprising the steps of:

providing a plurality of receivers at a receiver site, each said receiver coupled to a selected beam of a plurality of beams, said plurality of beams being divided among at least three multi-element arrays comprising dipoles over a ground plane, each array defining at least seven beams and substantially covering one-third of a horizontal circular region surrounding said receiver site, said plurality of beams dividing said region into sectors reached by individual ones of said plurality of beams; and employing said receivers to receive messages transmitted from a plurality of pagers via said plurality of beams.

2. The method of claim 1 wherein said employing step comprises:

receiving signals from said region via a plurality of elements of said multi-element antenna array;

feeding said signals from said elements into a beamforming network that generates an output corresponding to each of said plurality of beams, each said output being coupled to a receiver; and extracting messages from said plurality of beams.

3. The method of claim 2 wherein said beamforming network comprises:
- a circuit implementing Fast Fourier Transforms (FFTs) of said plurality of beams; and
- two to eight dipoles for each element operatively coupled to said circuit to produce a Butler network radiation pattern operating in accordance with a Taylor Line-Source procedure.

4. The method of claim 1 wherein said two-way paging protocol is Reflex™.

5. The method of claim 1 wherein said two-way paging protocol is Inflexion™.

6. In a two-way paging network, a receiver system comprising:
- a plurality of receivers at a receiver site; and
- a beamforming network, each output of said beamforming network being coupled to one of said plurality of receivers, each input of said beamforming network being coupled to an element of a multi-element antenna array;
- so that each said receiver is coupled to a selected beam of a plurality of beams, said plurality of beams divided among three multi-element arrays arranged in a triangle, each multi-element array comprising dipoles over a ground plane and substantially covering one-third of a horizontal circular region surrounding said receiver site, each multi-element array defining at least seven beams and said plurality of beams dividing said region into sectors reached by individual ones of said plurality of beams.

7. The receiver system of claim 6 further comprising:
- said multi-element antenna array.

8. The receiver system of claim 6 wherein said beamforming network comprises:
- a circuit configured to implement Fast Fourier Transforms (FFT) of said plurality of beams; and
- two to eight dipoles for each element operatively coupled to said circuit to produce a Butler network radiation pattern operating in accordance with a Taylor Line-Source procedure.

9. The receiver system of claim 6 wherein said two-way paging protocol is Reflex™.

10. The receiver system of claim 6 wherein said two-way paging protocol is Inflexion™.

* * * * *